United States Patent
Thomas et al.

(10) Patent No.: US 9,720,747 B2
(45) Date of Patent: Aug. 1, 2017

(54) METHOD FOR FLOW CONTROL AND RELIABLE COMMUNICATION IN A COLLABORATIVE ENVIRONMENT

(75) Inventors: Monroe M. Thomas, Calgary (CA); David B. McFadzean, Ganmore (CA); Matt Stephure, Calgary (CA); Kevin Robinson, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 679 days.

(21) Appl. No.: 13/586,085

(22) Filed: Aug. 15, 2012

(65) Prior Publication Data

US 2013/0046816 A1    Feb. 21, 2013

Related U.S. Application Data

(60) Provisional application No. 61/523,662, filed on Aug. 15, 2011, provisional application No. 61/523,670, filed on Aug. 15, 2011.

(51) Int. Cl.
*G06F 15/16* (2006.01)
*G06F 9/54* (2006.01)

(52) U.S. Cl.
CPC .................................. *G06F 9/546* (2013.01)

(58) Field of Classification Search
CPC .................................. G06F 15/16; G06F 9/546
See application file for complete search history.

(56) References Cited

U.S. PATENT DOCUMENTS 4,975,690 A   12/1990   Torres
5,345,550 A   9/1994    Bloomfield
(Continued)

FOREIGN PATENT DOCUMENTS

| CN | 101539932 | 9/2009 |
|----|-----------|--------|
| CN | 101883097 | 11/2010 |

(Continued)

OTHER PUBLICATIONS

International Search Report and Written Opinion, dated Mar. 19, 2015, received in connection with International Application No. PCT/US2014/064243.

(Continued)

*Primary Examiner* — Tonia L Dollinger
*Assistant Examiner* — Steven Nguyen
(74) *Attorney, Agent, or Firm* — Meunier Carlin & Curfman LLC

(57) ABSTRACT

Flow control of messages to/from clients and services in a remote access system. Within the remote access system a layered architecture may be provided that includes a client layer at a client device, a service layer associated with a service, and a server layer that is a communications proxy for messages sent between the client device and the service. The service layer may have a receive queue for messages received from the client device and a send queue of messages destined for the client device. The server layer may include an outbound queue of messages destined for the client device. Full duplex communications between the client layer and the server layer may be implemented using a service protocol in a first channel for communication between the client layer and the server layer and a second channel for communication between the server layer and the client layer.

18 Claims, 7 Drawing Sheets

(56) References Cited

U.S. PATENT DOCUMENTS

| | | |
|---|---|---|
| 5,555,003 A | 9/1996 | Montgomery et al. |
| 5,742,778 A | 4/1998 | Hao et al. |
| 5,844,553 A | 12/1998 | Hao et al. |
| 5,870,759 A | 2/1999 | Bauer et al. |
| 5,920,311 A | 7/1999 | Anthias |
| 5,978,842 A | 11/1999 | Noble et al. |
| 6,045,048 A | 4/2000 | Wilz et al. |
| 6,061,689 A | 5/2000 | Chang et al. |
| 6,075,531 A | 6/2000 | DeStefano |
| 6,141,698 A | 10/2000 | Krishnan et al. |
| 6,145,098 A | 11/2000 | Nouri et al. |
| 6,253,228 B1 | 6/2001 | Ferris et al. |
| 6,343,313 B1 | 1/2002 | Salesky et al. |
| 6,453,334 B1 | 9/2002 | Vinson et al. |
| 6,453,356 B1 | 9/2002 | Sheard et al. |
| 6,570,563 B1 | 5/2003 | Honda |
| 6,601,233 B1 | 7/2003 | Underwood |
| 6,792,607 B1 | 9/2004 | Burd et al. |
| 6,918,113 B2 | 7/2005 | Patel et al. |
| 6,938,096 B1 | 8/2005 | Greschler et al. |
| 6,970,459 B1 | 11/2005 | Meier |
| 6,976,077 B1 | 12/2005 | Lehew et al. |
| 7,065,568 B2 | 6/2006 | Bracewell et al. |
| 7,069,227 B1 | 6/2006 | Lintel, III et al. |
| 7,073,059 B2 | 7/2006 | Worely et al. |
| 7,149,761 B2 | 12/2006 | Cooke et al. |
| 7,167,893 B1 | 1/2007 | Malone et al. |
| 7,174,504 B2 | 2/2007 | Tsao |
| 7,181,686 B2 | 2/2007 | Bahrs |
| 7,193,985 B1 | 3/2007 | Lewis et al. |
| 7,240,162 B2 | 7/2007 | de Vries |
| 7,246,063 B2 | 7/2007 | James et al. |
| 7,320,131 B1 * | 1/2008 | O'Toole, Jr. ............ G06F 9/505 705/52 |
| 7,343,310 B1 | 3/2008 | Stender |
| 7,350,151 B1 | 3/2008 | Nakajima |
| 7,418,711 B1 * | 8/2008 | Lee ........................ G06F 9/544 709/223 |
| 7,451,196 B1 | 11/2008 | de Vries et al. |
| 7,577,751 B2 | 8/2009 | Vinson et al. |
| 7,620,901 B2 | 11/2009 | Carpenter et al. |
| 7,647,370 B1 | 1/2010 | Liu et al. |
| 7,650,444 B2 | 1/2010 | Dirstine et al. |
| 7,656,799 B2 | 2/2010 | Samuels et al. |
| 7,706,399 B2 | 4/2010 | Janczak |
| 7,725,331 B2 | 5/2010 | Schurenberg et al. |
| 7,802,183 B1 | 9/2010 | Essin |
| 7,831,919 B1 | 11/2010 | Viljoen et al. |
| 7,921,078 B2 | 4/2011 | McCuller |
| 7,941,488 B2 | 5/2011 | Goodman et al. |
| 7,966,572 B2 | 6/2011 | Matthews et al. |
| 8,024,523 B2 | 9/2011 | de Vries et al. |
| 8,261,345 B2 | 9/2012 | Hitomi et al. |
| 8,356,252 B2 | 1/2013 | Raman et al. |
| 8,359,591 B2 | 1/2013 | de Vries et al. |
| 8,509,230 B2 | 8/2013 | Vinson et al. |
| 8,527,706 B2 | 9/2013 | de Vries et al. |
| 8,572,178 B1 | 10/2013 | Frazzini et al. |
| 8,606,952 B2 | 12/2013 | Pasetto et al. |
| 8,607,158 B2 | 12/2013 | Molander et al. |
| 8,627,081 B2 | 1/2014 | Grimen et al. |
| 8,667,054 B2 | 3/2014 | Tahan |
| 8,832,260 B2 | 9/2014 | Raja et al. |
| 8,924,512 B2 | 12/2014 | Stoyanov et al. |
| 2001/0047393 A1 | 11/2001 | Arner et al. |
| 2002/0032751 A1 | 3/2002 | Bharadwaj |
| 2002/0032804 A1 | 3/2002 | Hunt |
| 2002/0092029 A1 | 7/2002 | Smith |
| 2003/0014735 A1 | 1/2003 | Achlioptas et al. |
| 2003/0023670 A1 | 1/2003 | Walrath |
| 2003/0055893 A1 | 3/2003 | Sato et al. |
| 2003/0065738 A1 | 4/2003 | Yang et al. |
| 2003/0120324 A1 | 6/2003 | Osborn et al. |
| 2003/0120762 A1 | 6/2003 | Yepishin et al. |
| 2003/0149941 A1 | 8/2003 | Tsao |
| 2003/0163514 A1 | 8/2003 | Waldschmidt |
| 2003/0184584 A1 | 10/2003 | Vachuska et al. |
| 2003/0208472 A1 | 11/2003 | Pham |
| 2004/0015842 A1 | 1/2004 | Nanivadekar et al. |
| 2004/0029638 A1 | 2/2004 | Hytcheson et al. |
| 2004/0039742 A1 * | 2/2004 | Barsness ............ G06F 17/3056 |
| 2004/0068516 A1 | 4/2004 | Lee et al. |
| 2004/0106916 A1 | 6/2004 | Quaid et al. |
| 2004/0117804 A1 | 6/2004 | Scahill et al. |
| 2004/0153525 A1 | 8/2004 | Borella |
| 2004/0162876 A1 | 8/2004 | Kohavi |
| 2004/0183827 A1 | 9/2004 | Putterman et al. |
| 2004/0236633 A1 | 11/2004 | Knauerhase et al. |
| 2004/0243919 A1 | 12/2004 | Muresan et al. |
| 2004/0249885 A1 | 12/2004 | Petropoulakis et al. |
| 2005/0005024 A1 * | 1/2005 | Samuels ................. H04L 69/16 709/238 |
| 2005/0010871 A1 | 1/2005 | Ruthfield et al. |
| 2005/0021687 A1 | 1/2005 | Anastassopoulos et al. |
| 2005/0050229 A1 | 3/2005 | Comeau et al. |
| 2005/0138631 A1 | 6/2005 | Bellotti et al. |
| 2005/0188046 A1 | 8/2005 | Hickman et al. |
| 2005/0188313 A1 | 8/2005 | Matthews et al. |
| 2005/0198578 A1 | 9/2005 | Agrawala et al. |
| 2005/0240906 A1 | 10/2005 | Kinderknecht et al. |
| 2006/0004874 A1 | 1/2006 | Hutcheson et al. |
| 2006/0026006 A1 | 2/2006 | Hindle |
| 2006/0031377 A1 | 2/2006 | Ng et al. |
| 2006/0036770 A1 | 2/2006 | Hosn et al. |
| 2006/0085835 A1 | 4/2006 | Istvan et al. |
| 2006/0101397 A1 | 5/2006 | Mercer et al. |
| 2006/0130069 A1 * | 6/2006 | Srinivasan .......... H04L 12/5855 719/314 |
| 2006/0231175 A1 | 10/2006 | Vondracek et al. |
| 2006/0236328 A1 | 10/2006 | DeWitt |
| 2006/0258462 A1 | 11/2006 | Cheng et al. |
| 2006/0265689 A1 | 11/2006 | Kuznetsov et al. |
| 2006/0271563 A1 | 11/2006 | Angelo et al. |
| 2006/0288171 A1 * | 12/2006 | Tsien .................... G06F 12/122 711/136 |
| 2006/0294418 A1 | 12/2006 | Fuchs |
| 2007/0024645 A1 | 2/2007 | Purcell et al. |
| 2007/0047535 A1 * | 3/2007 | Varma .................... H04L 47/10 370/360 |
| 2007/0067754 A1 | 3/2007 | Chen et al. |
| 2007/0079244 A1 | 4/2007 | Brugiolo |
| 2007/0112880 A1 | 5/2007 | Yang et al. |
| 2007/0120763 A1 | 5/2007 | De Paepe et al. |
| 2007/0130292 A1 | 6/2007 | Tzruya et al. |
| 2007/0136677 A1 | 6/2007 | Agarwal |
| 2007/0203944 A1 | 8/2007 | Batra et al. |
| 2007/0208718 A1 | 9/2007 | Javid et al. |
| 2007/0226636 A1 | 9/2007 | Carpenter et al. |
| 2007/0244990 A1 | 10/2007 | Wells |
| 2007/0256073 A1 | 11/2007 | Troung et al. |
| 2007/0282951 A1 | 12/2007 | Selimis et al. |
| 2008/0016155 A1 | 1/2008 | Khalatian |
| 2008/0134211 A1 | 6/2008 | Cui |
| 2008/0146194 A1 | 6/2008 | Yang et al. |
| 2008/0183190 A1 | 7/2008 | Adcox et al. |
| 2008/0313282 A1 | 12/2008 | Warila et al. |
| 2009/0044171 A1 | 2/2009 | Avadhanula |
| 2009/0080523 A1 | 3/2009 | McDowell |
| 2009/0089742 A1 | 4/2009 | Nagulu et al. |
| 2009/0119644 A1 | 5/2009 | de Vries et al. |
| 2009/0209239 A1 | 8/2009 | Montesdeoca |
| 2009/0217177 A1 | 8/2009 | DeGrazia |
| 2010/0061238 A1 | 3/2010 | Godbole et al. |
| 2010/0077058 A1 | 3/2010 | Messer |
| 2010/0131591 A1 | 5/2010 | Thomas et al. |
| 2010/0150031 A1 * | 6/2010 | Allen .................... H04L 67/14 370/276 |
| 2010/0174773 A1 | 7/2010 | Penner et al. |
| 2010/0205147 A1 | 8/2010 | Lee |
| 2010/0223566 A1 | 9/2010 | Holmes et al. |
| 2010/0268813 A1 | 10/2010 | Pahlavan et al. |

(56) References Cited

U.S. PATENT DOCUMENTS

| | | | |
|---|---|---|---|
| 2011/0138283 | A1 | 6/2011 | Marston |
| 2011/0157196 | A1 | 6/2011 | Nave et al. |
| 2011/0162062 | A1 | 6/2011 | Kumar et al. |
| 2011/0184993 | A1 | 7/2011 | Chawla et al. |
| 2011/0213830 | A1 | 9/2011 | Lopez et al. |
| 2011/0222442 | A1* | 9/2011 | Cole .................. H04L 67/1014 370/276 |
| 2011/0252152 | A1* | 10/2011 | Sherry .................. H04L 67/02 709/228 |
| 2012/0030275 | A1 | 2/2012 | Boller et al. |
| 2012/0084713 | A1 | 4/2012 | Desai et al. |
| 2012/0090004 | A1 | 4/2012 | Jeong |
| 2012/0133675 | A1 | 5/2012 | McDowell |
| 2012/0154633 | A1 | 6/2012 | Rodriguez |
| 2012/0221792 | A1 | 8/2012 | de Vries et al. |
| 2012/0226742 | A1 | 9/2012 | Momchilov et al. |
| 2012/0245918 | A1 | 9/2012 | Overton et al. |
| 2012/0246225 | A1 | 9/2012 | Lemire et al. |
| 2012/0271875 | A1 | 10/2012 | Cai |
| 2012/0324032 | A1 | 12/2012 | Chan |
| 2012/0324358 | A1 | 12/2012 | Jooste |
| 2013/0007227 | A1 | 1/2013 | Hitomi et al. |
| 2013/0031618 | A1 | 1/2013 | Momchilov |
| 2013/0046815 | A1 | 2/2013 | Thomas et al. |
| 2013/0046816 | A1* | 2/2013 | Thomas .................. G06F 9/546 709/203 |
| 2013/0054679 | A1 | 2/2013 | Jooste |
| 2013/0070740 | A1 | 3/2013 | Yovin |
| 2013/0117474 | A1* | 5/2013 | Ajanovic .............. G06F 13/124 710/29 |
| 2013/0138791 | A1 | 5/2013 | Thomas et al. |
| 2013/0147845 | A1 | 6/2013 | Xie et al. |
| 2013/0159062 | A1 | 6/2013 | Stiehl |
| 2013/0179962 | A1 | 7/2013 | Arai et al. |
| 2013/0262566 | A1 | 10/2013 | Stephure et al. |
| 2014/0240524 | A1 | 8/2014 | Julia et al. |
| 2014/0241229 | A1 | 8/2014 | Bertorelle et al. |
| 2014/0298420 | A1 | 10/2014 | Barton et al. |
| 2015/0067769 | A1 | 3/2015 | Barton et al. |
| 2015/0156133 | A1 | 6/2015 | Leitch et al. |
| 2015/0319252 | A1 | 11/2015 | Momchilov et al. |

FOREIGN PATENT DOCUMENTS

| | | |
|---|---|---|
| CN | 102129632 | 7/2011 |
| CN | 102821413 | 12/2012 |
| EP | 0349463 | 1/1990 |
| EP | 1422901 | 5/2004 |
| JP | 2007/084744 | 3/1995 |
| JP | 2002/055870 | 2/2002 |
| JP | 2004-287758 | 10/2004 |
| JP | 2005/031807 | 2/2005 |
| JP | 2005/521946 | 7/2005 |
| JP | 2008-099055 | 4/2008 |
| JP | 2010-256972 | 11/2010 |
| RU | 2295752 | 3/2007 |
| RU | 2298287 | 4/2007 |
| RU | 2305860 | 9/2007 |
| WO | 98/58478 | 12/1998 |
| WO | 01/16724 | 3/2001 |
| WO | 02/09106 | 1/2002 |
| WO | 03/032569 | 4/2003 |
| WO | 03/083684 | 10/2003 |
| WO | 2010/060206 | 6/2010 |
| WO | 2010/088768 | 8/2010 |
| WO | 2010/127327 | 11/2010 |
| WO | 2012/127308 | 9/2012 |
| WO | 2013/024343 | 2/2013 |
| WO | 2013/109984 | 7/2013 |
| WO | 2013/128284 | 9/2013 |
| WO | 2013/153439 | 10/2013 |

OTHER PUBLICATIONS

Extended European Search Report, dated Mar. 3, 2015, received in connection with related European Application No. 09828497.9.

Coffman, Daniel, et al., "A Client-Server Architecture for State-Dependent Dynamic Visualizations on the Web," IBM T.J. Watson Research Center, 2010, 10 pages.

Fraser, N., "Differential Synchronization," Google, Mountain View, CA, Jan. 2009, 8 pages.

Jourdain, Sebastien, et al., "ParaViewWeb: A Web Framework for 3D Visualization and Data Processing," International Journal of Computer Information Systems and Industrial Management Applications, vol. 3, 2011, pp. 870-877.

Microsoft Computer Dictionary, Microsoft Press, 5$^{th}$ Edition, Mar. 15, 2002, p. 624.

Mitchell, J. Ross, et al., A Smartphone Client-Server Teleradiology System for Primary Diagnosis of Acute Stroke, Journal of Medical Internet Research, vol. 13, Issue 2, 2011, 12 pages.

ParaViewWeb, KitwarePublic, retrieved on Jan. 27, 2014 from http://www.paraview.org/Wiki/ParaViewWeb, 1 page.

Remote Desktop Protocol (RDP), retrieved on May 4, 2014 from http://en.wikipedia.org/wiki/Remote_Desktop_Protocol, 7 pages.

Remote Desktop Services (RDS), Remote App, retrieved on May 4, 2014 from http://en.wikipedia.org/wiki/Remote_Desktop_Services, 9 pages.

Remote Desktop Services (RDS), Windows Desktop Sharing, retrieved on May 4, 2014 from http://en.wikipedia.org/wiki/Remote_Desktop_Services, 9 pages.

International Search Report, dated Feb. 19, 2010, in connection with International Application No. PCT/CA2009/001704.

International Preliminary Report on Patentability and Written Opinion, dated May 31, 2011, in connection with International Application No. PCT/CA2009/001704.

International Search Report, dated May 12, 2010, in connection with International Application No. PCT/CA2010/000154.

International Preliminary Report on Patentability and Written Opinion, dated Aug. 9, 2011, in connection with International Application No. PCT/CA2010/000154.

International Search Report and Written Opinion, dated Jul. 31, 2012, in connection with International Application No. PCT/IB2012/000562.

International Search Report, dated Dec. 20, 2012, in connection with International Application No. PCT/IB2012/001589.

International Preliminary Report on Patentability and Written Opinion, dated Feb. 18, 2014, in connection with International Application No. PCT/IB2012/001589.

International Search Report, dated Dec. 28, 2012, in connection with International Application No. PCT/IB2012/001590.

International Preliminary Report on Patentability and Written Opinion, dated Feb. 18, 2014, in connection with International Application No. PCT/IB2012/001590.

International Search Report and Written Opinion, dated Aug. 21, 2013, in connection with International Application No. PCT/IB2013/000676.

International Search Report and Written Opinion, dated Jul. 31, 2013, in connection with International Application No. PCT/IB2013/000720.

Extended European Search Report, dated Jun. 2, 2014, received in connection with European Application No. 12760310.8.

Search Report and Written Opinion, dated Nov. 16, 2015, received in connection with SG Application No. 2013087150.

International Search Report and Written Opinion, dated Jun. 30, 2016, received in connection International Patent Application No. PCT/IB2016/000277.

International Preliminary Report on Patentability and Written Opinion, dated May 31, 2016, received in connection International Patent Application No. PCT/US2014/064243.

Search Report, dated Dec. 30, 2016, received in connection with CN Application No. 2012800398130. (and English Translation).

* cited by examiner

METHOD FOR FLOW CONTROL AND RELIABLE COMMUNICATION IN A COLLABORATIVE ENVIRONMENT

CROSS-REFERENCE TO RELATED APPLICATIONS

This application claims priority to U.S. Provisional Patent Application No. 61/523,662, filed Aug. 15, 2011, entitled "Method for Recoverable and Reliable Communications in a Collaborative Environment." This application also claims priority to U.S. Provisional Patent Application No. 61/523,670, filed Aug. 15, 2011, entitled "Method for Flow Control in a Collaborative Environment." The disclosures of the above-referenced applications are incorporated herein by reference in their entireties.

BACKGROUND

Ubiquitous remote access to services, application programs and data has become commonplace as a result of the growth and availability of broadband and wireless network access. As such, users are accessing application programs and data using an ever-growing variety of client devices (e.g., mobile devices, table computing devices, laptop/notebook/desktop computers, etc.). Data may be communicated to the devices from a remote server over a variety of networks including, 3G and 4G mobile data networks, wireless networks such as WiFi and WiMax, wired networks, etc. Clients may connect to a server offering the services, applications programs and data across many disparate network bandwidths and latencies. However, the services usually connected to the server via a high-bandwidth low-latency dedicated connection.

To effectively use full duplex communications to connect many clients to, e.g., one service through a server, a flow control mechanism is needed. The great disparity in bandwidth between the service and the server, and the clients and the server, presents a challenge to the implementation of the service, which must be able to provide timely information to each client according to the limits and capability of each client's connection.

SUMMARY

Disclosed herein are systems and methods for providing flow control in a remote access system. The method may include providing a client layer at a client device; providing a service layer associated with a service, the service layer having a service receive queue for messages received from the client device and a service send queue of messages destined for the client device; providing a server layer as a communications proxy for messages sent between the client device and the service, the server layer containing an outbound client queue of messages destined for the client device; and communicating a control signal to the service layer to send the messages in the service send queue to the server layer for transmission to the client device.

In accordance with some implementations, there is provided a method of providing recoverable (reliable) communications, comprising providing a client layer that remotely accesses an application over a network connection; providing a server layer that proxies communications between the client layer and the application; facilitating full duplex communications between the client layer and the server layer by implementing an service protocol in a first channel for communication between the client layer and the server layer, and the service protocol in a second channel for communication between the server layer and the client layer; detecting a failure of communication on the first channel or the second channel; and upon detecting the failure on the first channel or the second channel, reestablishing communication using the service protocol.

In accordance with yet other implementations, there is provided a computer readable medium having computer executable instructions thereon that when executed by a processor of a computing device, performs a method comprising providing a service layer associated with a service, the service layer having a service receive queue for messages received from a client device and a service send queue of messages destined for the client device; providing a server layer as a communications proxy for messages sent between the client device and the service, the server layer containing an outbound client queue of messages destined for the client device; and communicating a control signal to the service layer to send the messages in the service send queue to the server layer for transmission to the client device.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing applications, it will become evident to those skilled in the art that the implementations are not limited thereto, but are applicable for remotely accessing any type of data or service via a remote device.

Figure 1:
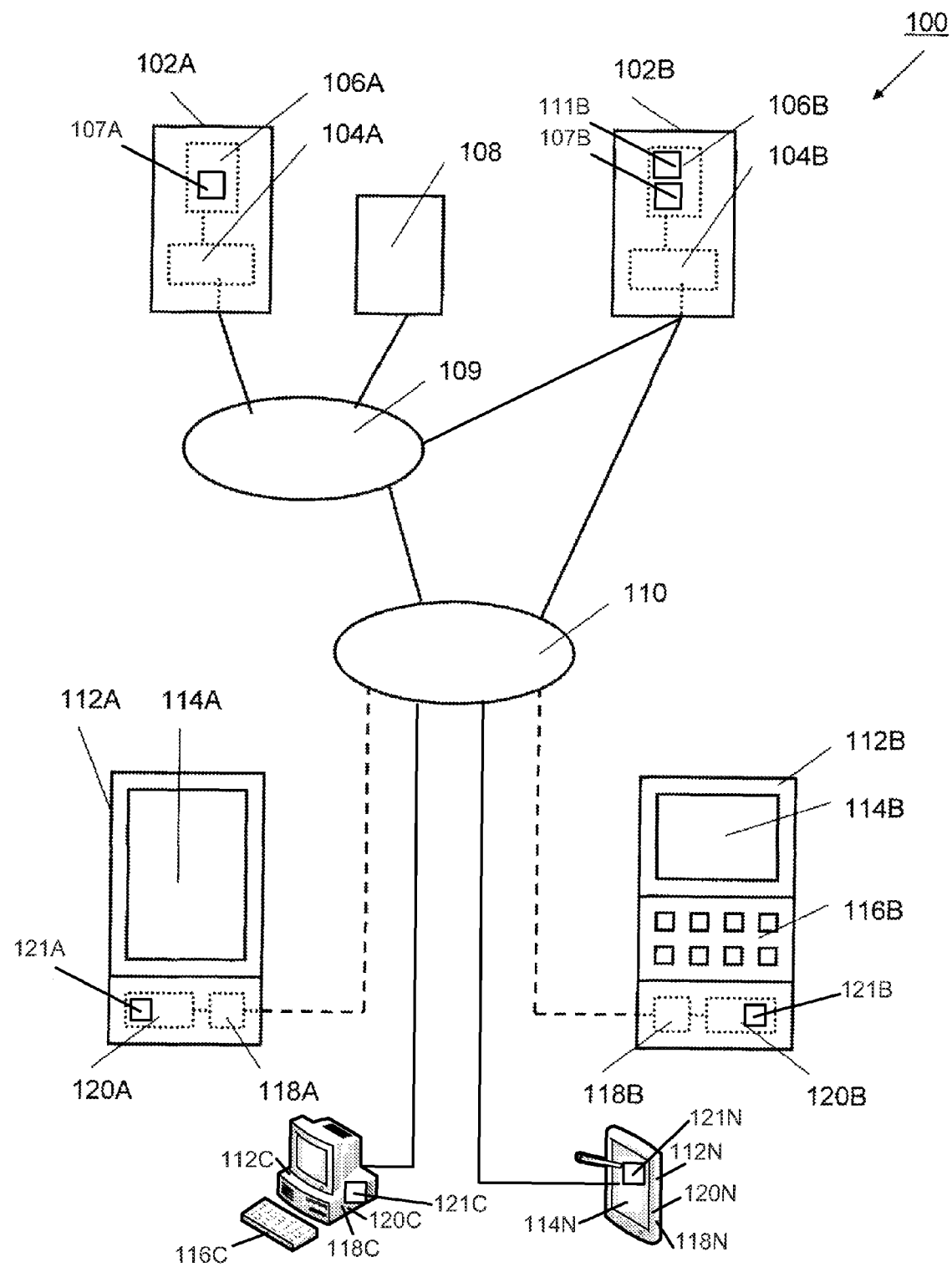
FIG. 1 is a simplified block diagram illustrating a system for providing remote access to an application at a remote device via a computer network.

Referring to FIG. 1, a system 100 for providing remote access to an application, data or other service via a computer network. The system comprises a client computer 112A or 112B, such as a wireless handheld device such as, for example, an IPHONE 112A or a BLACKBERRY 112B—connected via a computer network 110 such as, for example, the Internet, to a server 102B. Similarly, the client computing devices may also include a desktop/notebook personal computer 112C or a tablet device 112N that are connected by the communication network 110 to the server 102B. It is noted that the connections to the communication network 110 may be any type of connection, for example, Wi-Fi (IEEE 802.11x), WiMax (IEEE 802.16), Ethernet, 3G, 4G, etc.

The server 102B is connected, for example, via the computer network 110 to a Local Area Network (LAN) 109 or may be directly connected to the computer network 110. For example, the LAN 109 is an internal computer network of an institution such as a hospital, a bank, a large business, or a government department. Typically, such institutions still use a mainframe computer 102A and a database 108 connected to the LAN 109. Numerous application programs 107A may be stored in memory 106A of the mainframe computer 102A and executed on a processor 104A. Similarly, numerous application programs 107B may be stored in memory 106B of the server 102B and executed on a processor 104B. As used herein, the application programs 107A and 107B may be "services" offered for remote access. The mainframe computer 102A, the server 102B and the client computers 112A, 112B, 112C or 112N may be implemented using hardware such as that shown in the general purpose computing device of FIG. 6.

A client remote access program 121A, 121B, 121C, 121N may be designed for providing user interaction for displaying data and/or imagery in a human comprehensible fashion and for determining user input data in dependence upon received user instructions for interacting with the application program using, for example, a graphical display with touchscreen 114A or a graphical display 114B/114N and a keyboard 116B/116C of the client computers 112A, 112B, 112C, 112N, respectively. For example, the client remote access program is performed by executing executable commands on processor 118A, 118B, 118C, 118N with the commands being stored in memory 120A, 120B, 120C, 120N of the client computer 112A, 112B, 112C, 112N, respectively. Alternatively, a user interface program is executed on the server 102B (as one of application programs 107B) which is then accessed via an URL by a generic client application such as, for example, a web browser executed on the client computer 112A, 112B. The user interface is implemented using, for example, Hyper Text Markup Language HTML 5.

Figure 2:
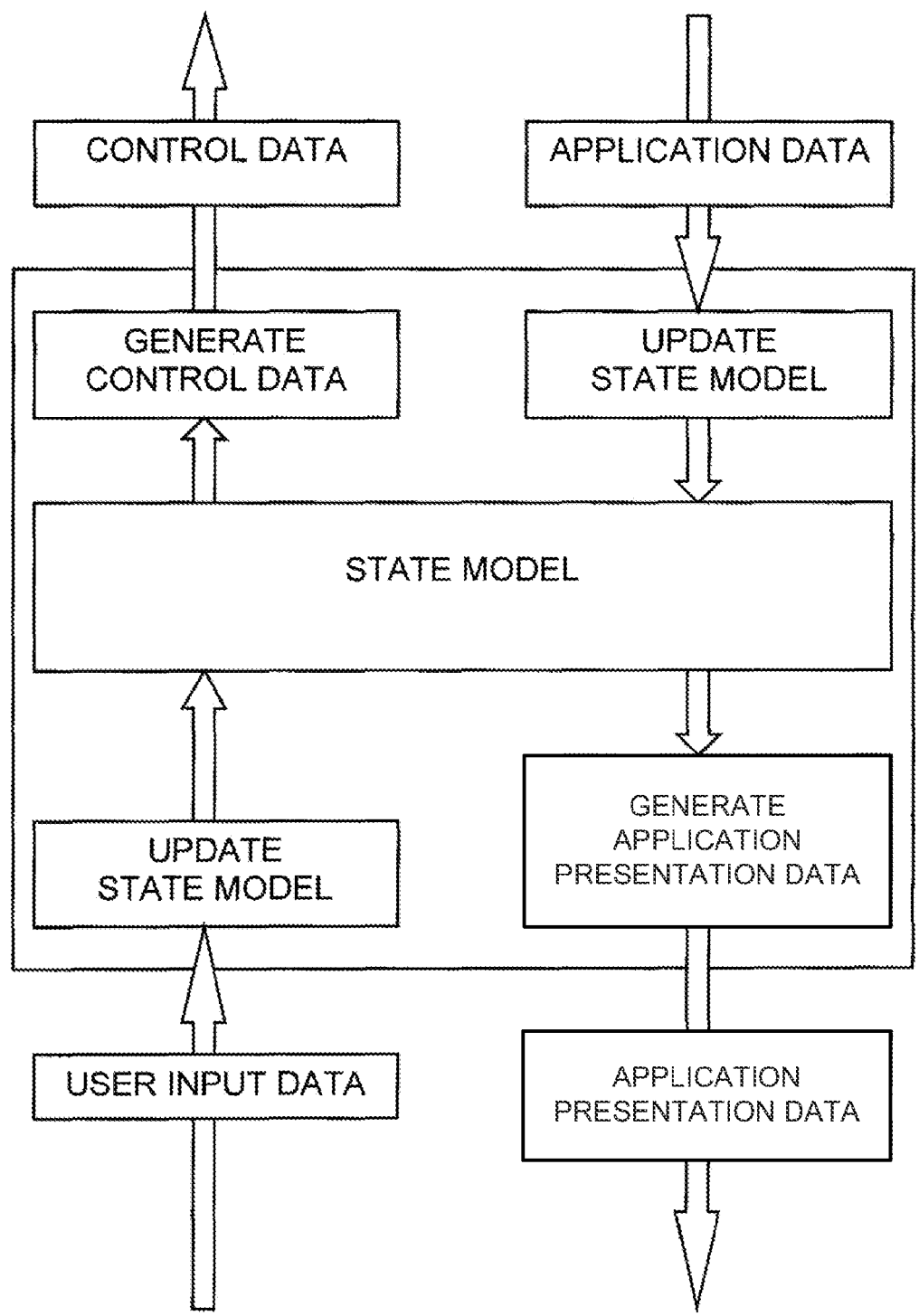
FIG. 2 is a simplified block diagram illustrating operation of the remote access program.

The operation of a server remote access program 111B with the client remote access program 121A, 121B, 121C, 121N can be performed in cooperation with a state model, as illustrated in FIG. 2. When executed, the client remote access program 121A, 121B, 121C, 121N updates the state model in accordance with user input data received from a user interface program. The remote access program 121A, 121B, 121C, 121N may generate control data in accordance with the updated state model, and provide the same to the server remote access program 111B running on the server 102B.

Upon receipt of application data from an application program 107A or 1097B, the server remote access program 111B updates the state model in accordance with the screen or application data, generates presentation data in accordance with the updated state model, and provides the same to the client remote access program 121A, 121B, 121C, 121N on the client computing device. The state model comprises an association of logical elements of the application program with corresponding states of the application program, with the logical elements being in a hierarchical order. For example, the logical elements may be a screen, a menu, a submenu, a button, etc. that make up the application program user interface. This enables the client device, for example, to natively display the logical elements. As such, a menu of the application program that is presented on a mobile phone will look like a native menu of the mobile phone. Similarly, the menu of the application program that is presented on desktop computer will look like a native menu of the desktop computer operating system.

The state model is determined such that each of the logical elements is associated with a corresponding state of the application program 107A or 107B. The state model may be determined such that the logical elements are associated with user interactions. For example, the logical elements of the application program are determined such that the logical elements comprise transition elements with each transition element relating a change of the state model to one of control data and application representation data associated therewith.

In some implementations, two or more of the client computing devices 112A, 112B, 112C . . . 112N may collaboratively interact with the application program 107A or 107B. As such, by communicating state information between each of the client computing devices 112A, 112B, 112C . . . 112N participating in a collaborative session and the mainframe computer 102A or server 102B, each of the participating client computing devices 112A, 112B, 112C . . . 112N may present a synchronized view of the display of the application program 107A or 107B.

Figure 3A:
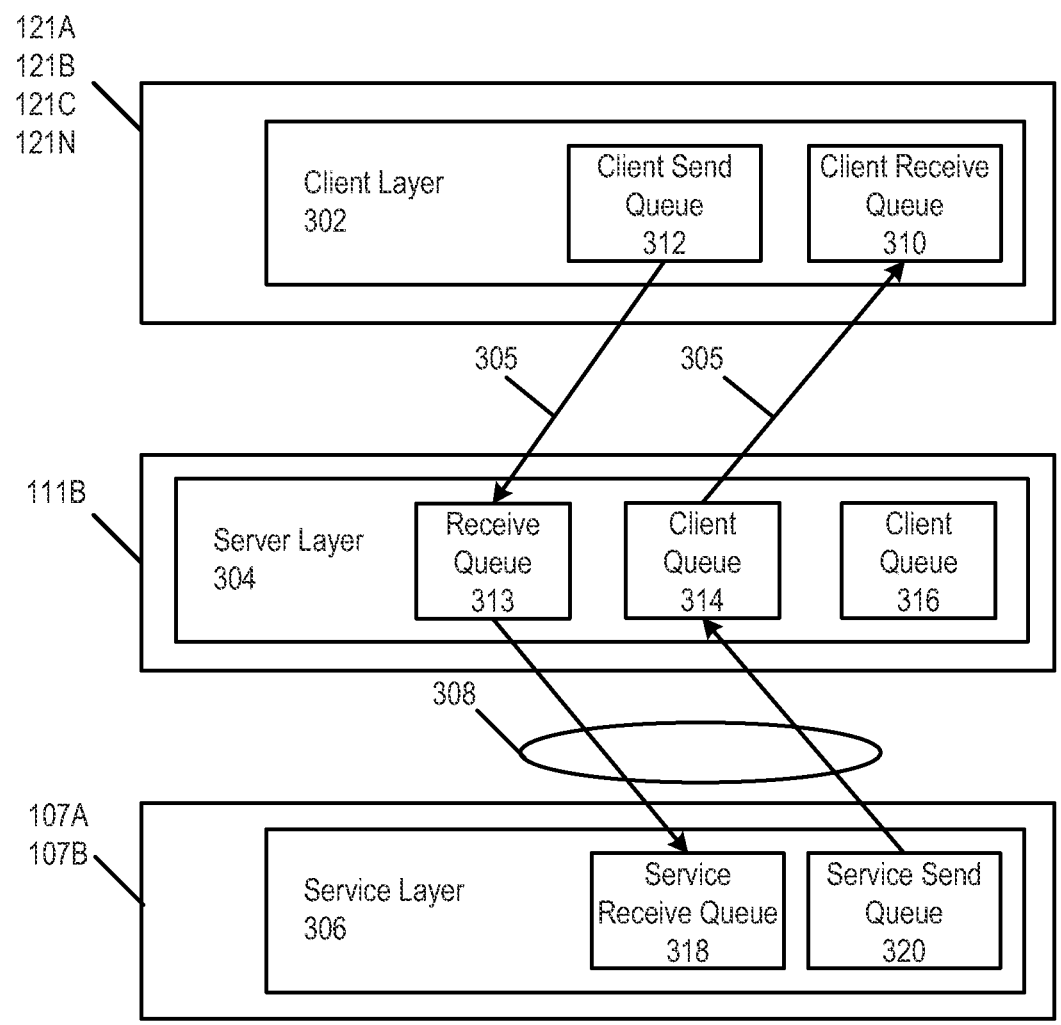
FIG. 3A illustrates a layered architecture in accordance with the present disclosure.

FIG. 3A illustrates a layered architecture in accordance with the present disclosure. The layered architecture implements a flow control process which allows, e.g., the server 102B to effectively use full duplex communications to connect one or more clients (112A, 112B, 112C, 112N, etc.) to one service 107A or 107B through the server 102B. For example, full duplex communications may be achieved by using two half-duplex communications connections 305 between the clients 112A, 112B, 112C, 112N and the server remote access program 111B. As such, there is provided a mechanism for the service to tailor the production of information to match a client's network connection characteristics independent of other clients' network connection characteristics.

As illustrated in FIG. 3A, there are three layers in the system: a client layer 302, a server layer 304 and a service layer 306. In accordance with the present disclosure, the layered architecture accounts for the disparity in bandwidth between service/server and server/client(s). In particular, because of the disparities, the service 306 may asynchronously produce information at a rate for each client 112A, 112B, 112C, 112N such that the outbound message queues (described below) maintained on the server 102B for one or more clients grow much faster than they can be emptied. This may lead to undesirable performance characteristics, because the older information in the queues must be transmitted before newer information. This becomes more problematic as time passes and queue lengths expand because the client view becomes further and further behind the current state of the service.

The client layer 302 resides in the each client 112A, 112B, 112C, 112N and is used to connect to the server layer 304. Typically, this includes the client application 121A, 121B, 121C, 121N, e.g., a web browser, dedicated application, etc. The server layer 304 serves to proxy communications from each client 112A, 112B, 112C, 112N to the service layer 306, as described below. In accordance with the present disclosure, each client 112A, 112B, 112C, 112N has a unique identifier (e.g., a session id). Each client layer 302 contains a client receive queue 310 of messages received from the server 102B, which are sent on behalf of a service (application 107A or 107B) to which the client is logically connected. Each client layer 302 also contains a client send queue 312 of messages it sends to the server 102B, which are destined for one particular service (e.g., 107B).

An instance of the service layer 306 (e.g., associated with application 107A or 107B) connects to the server layer 304, which proxies communications from the service to each client logically associated with that service. The service layer 306 contains a service receive queue 318 of messages it receives from the server on behalf of all clients the service is logically connected to. Each message is labeled with the unique identifier of the client the server received the message from. The service layer 306 also contains a service send queue 320 of messages it sends to the server 102B. Each message is destined for only one of the clients logically connected to the server 102B. If the server 102B needs to send certain content to each client, it creates a message containing that content for each logically connected client. Each message is labeled with the unique identifier the client the server should send the message to.

Figure 3B:
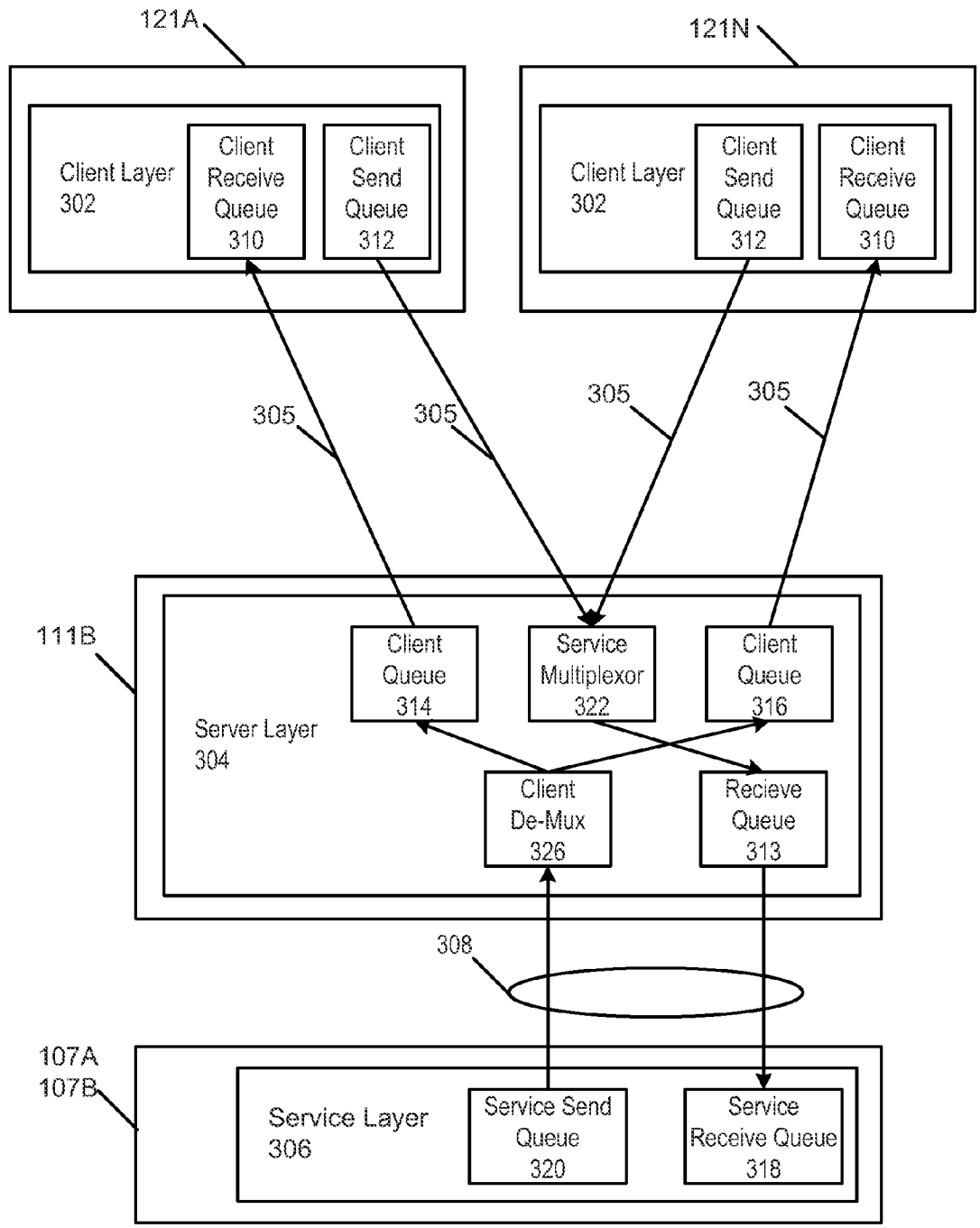
FIG. 3B illustrates another layered architecture in accordance with the present disclosure that illustrates a many-to-one relationship of clients communicating to a service.

FIG. 3B illustrates another layered architecture in accordance with the present disclosure that illustrates a many-to-one relationship of clients to a service. Like elements to the architecture of FIG. 3A are not described again hereinbelow. FIG. 3B illustrates two clients (112A and 112N) communicating to one service (107A or 107B). The server layer 304 logically connects clients to the service layer 306 in a many-to-one relationship by providing a service multiplexor 322 and a client de-mux 326 that serve to receive communications from the clients and from the service, respectively, as described below.

In FIG. 3B, the server layer 304 acts as a communications proxy for all messages sent between the clients and the service. Messages from of each connected client are received at the service multiplexor 322 in the server layer 304, which labels the inbound messages using a unique identifier associated with the particular client 121A or 121N that sent the message to the server layer 304. The unique identifier may be, for example, the session id. The service multiplexor 322 then combines (multiplexes) the messages into a single stream of messages destined for the service layer 306. The single stream of messages my first be queued in the receive queue 313.

When the service layer 306 communicates to the clients, outbound messages are queued in the service send queue 320 and are communicated to the client de-mux 326 in the server layer 304. The client de-mux 326 examines the unique identifier of the message and parses the messages into an appropriate client queue 314 or 316 in accordance with the unique identifier of the message and the destination client device. The messages are communicated from the client queue 314 or 316 to the client 121A or 121N over its respective half-duplex communication connection 305.

While the architecture of FIG. 3B is described as connecting plural clients to a service in a many-to-one fashion, the architecture could also connect a single client to the service where the service multiplexor 322 and client de-mux 326 would merely pass messages streams between the client and the service without alteration thereof.

Figure 4:
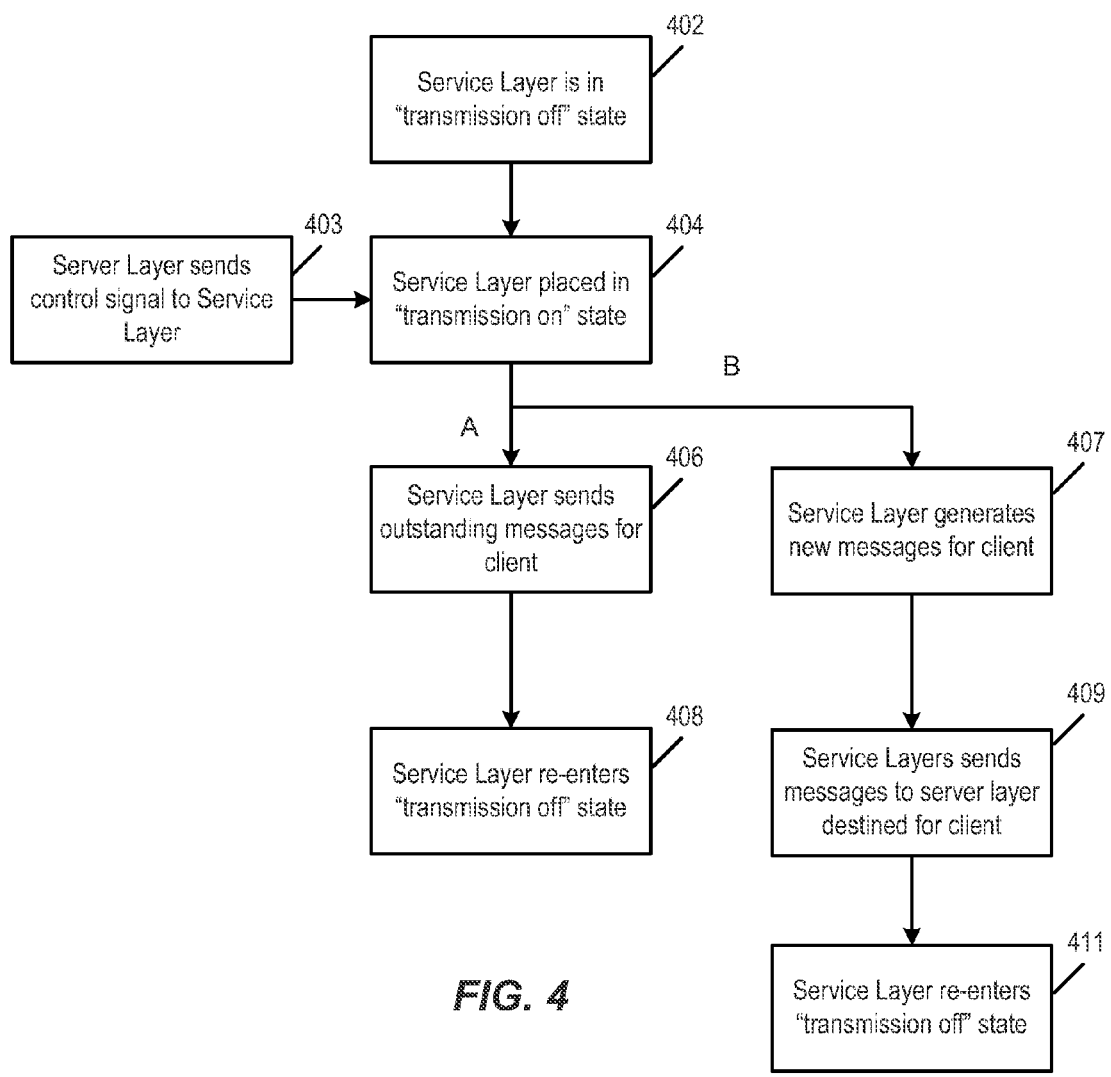
FIG. 4 illustrates a flow diagram of example operations performed within the system of FIGS. 1-2, 3A and 3B.

FIG. 4 illustrates an operational flow diagram 400 of providing a control signal that controls the message flow associated with a service for each logically connected client in the architectures of FIGS. 3A, 3B. Initially, the service layer 306 is in a "transmission off" state with respect to each logically connected client (S402; FIG. 4). That is, the service layer 306 will not produce any messages for any logically connected client. When the service layer 306 receives a "transmission on" message from the server 102B containing the unique identifier of one of the clients, it enters the "transmission on" state with respect to that client (S404; FIG. 4). In accordance with some implementations (path "A" in FIG. 4), when in the "transmission on" state for a given client, the service layer 306 will send all outstanding messages for that client to the server layer 304 via a low-latency, high-bandwidth link 308, which may also provide for full-duplex communications using two half-duplex links (S406; FIG. 4), and then re-enter the "transmission off" state with respect to that client (S408; FIG. 4).

In some implementations, the service layer 306 may also allow its subcomponents to asynchronously generate message fulfillment requests for any client. In this implementation (path "B" in FIG. 4), when the service layer 306 enters the "transmission on" state for a given client, it will generate new messages associated with pending message fulfillment requests for the client (S407; FIG. 4), send any outstanding and newly generated messages to the server (S409; FIG. 4), and then re-enter the "transmission off" state with respect to that client (S411; FIG. 4).

When the server layer 304 receives a message from a logically connected client, the server layer 304 labels the message with the client's unique identifier and sends it to the service layer 306. In some implementations, the messages are labeled and combined by the service multiplexor 322 into a single stream of messages. The inbound messages may be queued in a receive queue 313.

When the server layer 304 receives a message from the service layer 306, the server layer 304 places the message in a client queue 314 or 316 of outbound messages to be sent to the client for which the message is labeled. In some implementations, the outstanding messages may be processed by the client de-mux 326 before being placed into the client queue 314 or 316. When the outbound message client queue 314 or 316 for a client is empty, the server layer 304 sends a "transmission on" message containing the unique identifier of the client to the associated service layer (S403; FIG. 4). In an implementation, the size of the outbound message client queues 314 and 316 on the server does not grow unbounded, and that any information placed in the outbound queues will always be relatively "fresh."

Thus, as described above message queues may be managed to account for latency and bandwidth disparities. The result of the above is that an outbound message queue on the server is only empty under two conditions: (1) there is no information to be sent to a client, (2) if enough time and bandwidth have allowed the server to send all of the messages, or some combination of (1) and (2).

With reference to FIGS. 3A and 3B, in accordance with some implementations, HTTP/HTTPS protocols may be used as a service protocol to simulate the full duplex connection between client and server by using two concurrent HTTP/HTTPS connections over the communication connections 305. With HTTP/HTTPS, it is possible to send an "infinite request" from the client to the server. In this case, the server is instructed that the length of the request payload is indeterminate, and in this fashion, information may be streamed continually from the client to the server. It is also possible to receive an "infinite response" over HTTP/HTTPS. In this case, the client is instructed that the length of the response payload is indeterminate, and in this fashion, information may be continually streamed from the server to the client. Thus, a full duplex communication circuit may be fashioned from two half duplex HTTP/HTTPS channels. As will be described, the client initiates both connections, listening on the "infinite response" connection while transmitting on the "infinite request" connection.

As noted above, each client layer 302 contains a client receive queue 310 of messages received from the server 102B, which are sent on behalf of a service (application program 107A, 107B) to which the client is logically connected. The client layer 302 receives these messages using an "infinite response" over one HTTP/HTTPS connection (although any other half duplex connection will suffice). Each client layer 302 also contains a client send queue 312 of messages it sends to the server 102B, which are destined for one particular service (e.g., application program 107A, 107B). The client layer 302 sends these messages using an "infinite request" over a second HTTP/HTTPS connection (although any other half duplex connection will suffice).

When the server layer 304 receives a message from a client, the server layer 304 labels the message with the client's unique identifier and sends it to the service layer 306. The message is typically received by the server layer 304 via an "infinite request" made over one HTTP/HTTPS connection. When the server layer 304 receives a message from the service layer 306, the server layer 304 places the message in the client queue 314 or 316 of outbound messages to be sent to the client for which the message is labeled. The messages are then sent from the client queue 314 or 316 via an "infinite response" made over a second HTTP/HTTPS connection.

A failure of the HTTP/HTTPS communications channel (or any half duplex communications channel) utilized in the layered architecture may result in undesirable performance characteristics. Distinguishing between silence on the listening end of a half duplex channel and failure of that channel is sometimes difficult, whereas detecting a failure of a half duplex channel from the transmitting end is generally not a problem. Also, one or more messages may be "in flight" between the client and server when a half duplex communications channel fails. In this circumstance, there is no way for the transmitting end of a half duplex channel to know which messages have been successfully received.

Thus, in accordance with implementations of the present disclosure, there is provided methods for detection of communications failure from the listening side of a connection and recovery of information that may have been "in flight" over one or both connections at the time of failure. Further, while the information has been described as being communicated using HTTP/HTTPS protocols, other protocols that provide connection-based communications maybe utilized, such as FTP, UDP, RTSP, RTP, etc.

Figure 5:
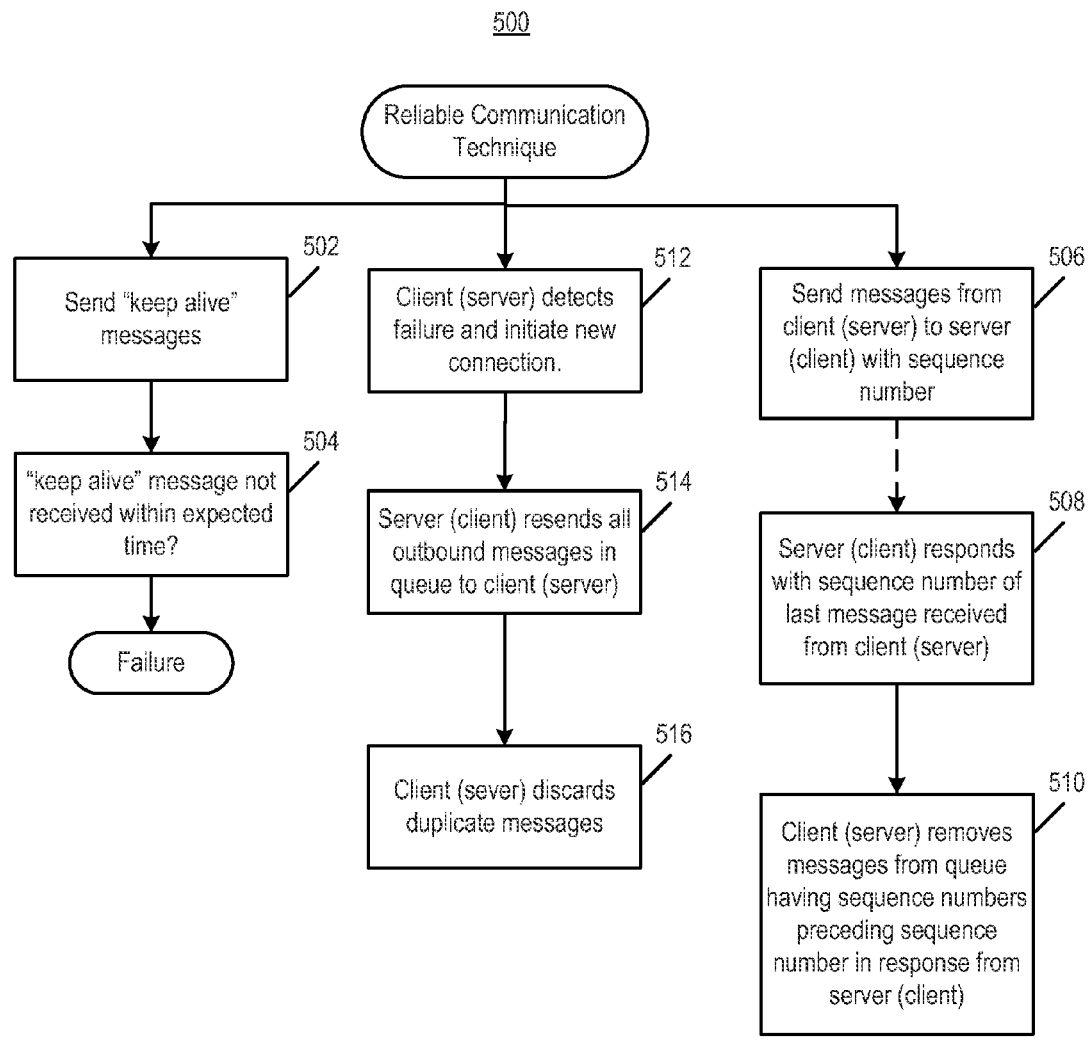
FIG. 5 illustrates a flow diagram of example operations performed within the system of FIGS. 1-2, 3A and 3B.

FIG. 5 illustrates an operational flow diagram 500 of providing reliable messaging associated with a service for each logically connected client as follows. For example, in some implementations, frequent "keep alive" messages may be sent from service to client and from client to service (S502; FIG. 5). This allows the listening end of a communication channel to distinguish silence from failure. If the listening end of a half duplex channel does not receive a "keep-alive" message within an expected period of time, it may assume that the connection has failed, and take steps to initiate a new connection (client side), or wait for new connection (server side) (S504; FIG. 5).

In some implementations, independent message sequence numbers may be used on the client and server. Every message sent from the client send queue 312 to the server may be annotated with a sequence number indicating the order in which each message is sent relative to all other messages sent to the server (S506; FIG. 5). When a message is sent from the client, it is not immediately removed from the client's outbound queue. The next message in the client's outbound message queue becomes the next message to be sent, under normal operation. Similarly, every message sent from the server outbound message client queue 314 or 316 to a client is annotated with a sequence number indicating the order in which each message is sent relative to all other messages sent to the client (S506; FIG. 5). When a message is sent from the server, it is not immediately removed from the server's outbound queue. The next message in the server's outbound message queue becomes the next message to be sent, under normal operation.

In some implementations, building upon the previous implementations, "sequence acknowledgement" message annotations may be used between the client and server so that each side knows what messages have been successfully received by the other. Every time the client sends a message to the server, the client annotates the message with the sequence number of the last message it successfully received from the server on the "listening" connection (S508; FIG. 5). If the server receives this message, the server can safely remove the message associated with the sequence number from its outbound queue, and all preceding it (S510; FIG. 5). Similarly, every time the server sends a message to the client, the server annotates the message with the sequence number of the last message it successfully received from the client on the "listening" connection (S508; FIG. 5). If the client receives this message, the client can safely remove the message associated with the sequence number from its outbound queue, and all preceding it (S510; FIG. 5).

In some implementations, when a new connection is initiated because of failure, any messages previously sent that remain in the associated outbound queue may not have been received by the other side, and are re-sent. When the client detects a failure on the "infinite response" channel (i.e., the channel it is listening on), it abandons that connection and initiates a new HTTP/HTTPS "infinite response" connection (S512; FIG. 5). If this succeeds, the server recognizes the new connection and starts sending from the start of its outbound message queue, instead of from after the last message it previously sent (S514; FIG. 5). In this fashion, any in-transit messages that the client may not have received will be resent. The client may detect some duplicate messages that it had not been able to successfully acknowledge to the server, and it can safely throw such duplicate messages away (S516; FIG. 5). Such messages will have a sequence number less than or equal to the last successful sequence number received before failure detection. Similarly, when the client detects a failure on the "infinite request" channel (i.e., the channel it is transmitting on), it abandons that connection and initiates a new HTTP/HTTPS "infinite request" connection (S512; FIG. 5). If this succeeds, it starts sending messages from the start of its outbound queue, instead of from after the last message it previously sent (S514; FIG. 5). The server recognizes the new connection and safely ignores any duplicate messages it receives that it may not have had a chance to successfully acknowledge (S516; FIG. 5). Such messages will have a sequence number less than or equal to the last successful sequence number received before the new connection was initiated. Thus, as long as the client is able to successfully initiate new HTTP/HTTPS connections, all communications failures can be recovered from successfully. In the case that a new connection cannot be made within an acceptable period of time, it then timeouts on both the server, and client side can be used to terminate the session, recover resources, and take other appropriate actions. If a connection is attempted by the client after the session is terminated on the server, then the server will reject the connection attempt, and the client can inform the user and/or take other appropriate actions.

It is noted that combinations of the above techniques may be used to provide reliable (recoverable) communications. Thus, the above techniques provide for reliable communication between a client and a server while providing full-duplex communication capabilities.

Figure 6:
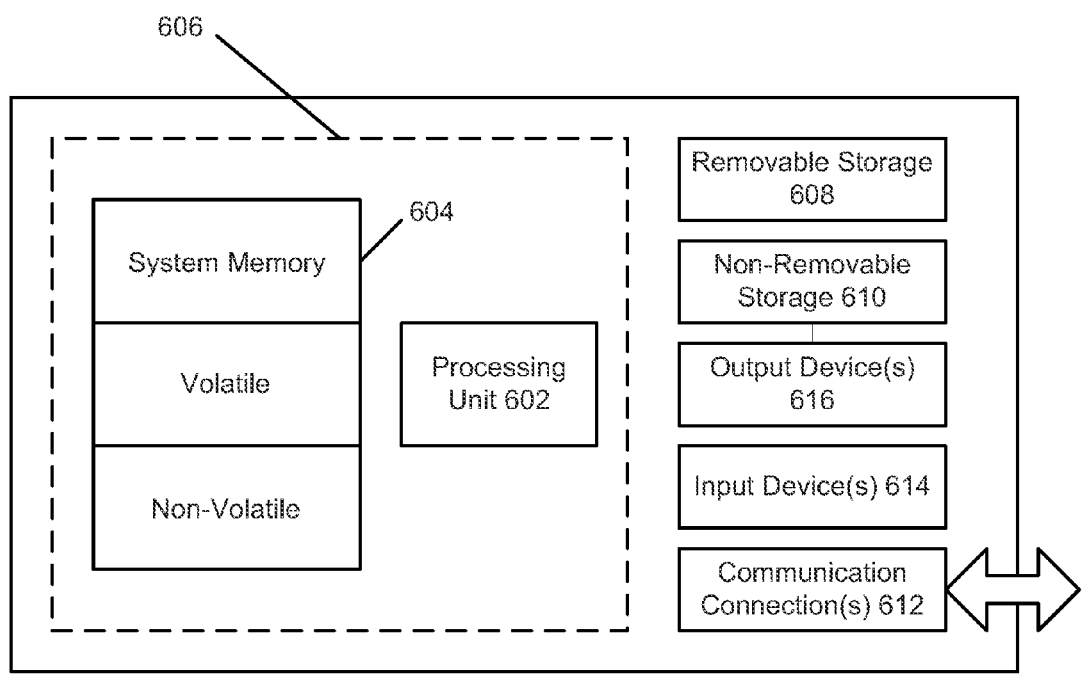
FIG. 6 illustrates an exemplary computing device.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, servers, handheld or laptop devices, multiprocessor systems, microprocessor-based systems, network personal computers (PCs), mini-computers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of tangible computer readable media. Computer readable media can be any available tangible media that can be accessed by device 600 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of providing flow control in a remote access system, comprising:
    providing a client layer at a client device;
    providing a service layer associated with a service, the service layer having a service receive queue for messages received from the client device and a service send queue of messages destined for the client device;
    providing a server layer as a communications proxy for messages sent between the client device and the service, the server layer containing an outbound client queue of messages destined for the client device, wherein the outbound client queue is uniquely associated with the client layer of the client device to which the messages are to be communicated; and communicating from the server layer to the service layer a transmission-on message that contains a unique identifier of the client device; and upon receiving the transmission-on message at the service layer, sending the messages in the service send queue to the server layer for transmission to the client device.

2. The method of claim 1, further comprising:
setting the service layer to a transmission-off state such that messages are queued in the service send queue;
sending messages for the client device to the outbound client queue in the server layer; and
re-entering the transmission-off state at the service layer.

3. The method of claim 1, further comprising:
initially setting the service layer to a transmission-off state;
generate messages for the client device at the service layer; and
queuing the messages for the client device in the service send queue.

4. The method of claim 3, further comprising:
sending messages for the client device to the outbound client queue in the server layer; and
re-entering the transmission-off state at the service layer.

5. The method of claim 1, further comprising:
receiving communications from plural client devices and labeling messages from each of the plural client devices with the unique identifier associated with each client device; and
combining messages from plural client devices into a single stream of messages.

6. The method of claim 5, further comprising:
parsing a stream of messages from the service layer into plural message streams, wherein each of the plural message streams is associated with one of the plural client devices by the unique identifier; and
communicating each of plural message streams to the plural client devices.

7. The method of claim 1, further comprising asynchronously generating messages to the client device.

8. A non-transitory computer readable medium having computer executable instructions thereon that when executed by a processor of a computing device, performs a method comprising:
providing a service layer associated with a service, the service layer having a service receive queue for messages received from a client device and a service send queue of messages destined for the client device;
providing a server layer as a communications proxy for messages sent between the client device and the service, the server layer communicating with the client device across a first network connection of a first bandwidth and communicating with the service layer across a second network connection of a second bandwidth, the service layer further containing an outbound client queue of messages destined for the client device; and
communicating from the server layer to the service layer a transmission-on message that contains a unique identifier of the client device, wherein upon receiving the transmission-on message, the service layer sends the messages in the service send queue to an outbound client queue in the server layer for transmission to the client device, wherein the outbound client queue is uniquely associated with the client device to which the messages are to be communicated.

9. The non-transitory computer readable medium of claim 8, further comprising instructions for:

setting the service layer to a transmission-off state such that messages are queued in the send queue;
sending messages for the client device to outbound client queue in the server layer; and
re-entering the transmission-off state at the service layer.

10. The non-transitory computer readable medium of claim 8, further comprising instructions for:
initially setting the service layer to a transmission-off state;
generate messages for the client device at the service layer;
queuing the messages for the client device in the service send queue;
setting the service layer to a transmission-on state using the transmission-on message;
sending messages for the client device to the outbound client queue in the server layer; and
re-entering the transmission-off state at the service layer.

11. The non-transitory computer readable medium of claim 8, further comprising instructions for labeling each message with a unique identifier of the client device.

12. The non-transitory computer readable medium of claim 8, further comprising instructions for asynchronously generating messages to the client device.

13. The non-transitory computer readable medium of claim 8, further comprising instructions for establishing relationships between plural client devices and the service layer in a many-to-one fashion.

14. A method of providing flow control in a remote access system, comprising:
providing a client layer at a client device;
providing a service layer associated with a service, the service layer having a service receive queue for messages received from the client device and a service send queue of messages destined for the client device;
providing a server layer as a communications proxy for messages sent between the client device and the service layer, the server layer containing an outbound client queue of messages destined for the client device, wherein the outbound client queue is uniquely associated with the client layer of the client device to which the messages are to be communicated; and
communicating from the server layer to the service layer a transmission-on message that contains a unique identifier of the client device; and
upon receiving the transmission-on message at the service layer, entering the service layer into a transmission on state and sending the messages in the service send queue to the server layer for transmission to the client device.

15. The method of claim 14, further comprising receiving communications from plural client devices and labeling messages from each of the plural client devices with a respective unique identifier associated with each client device.

16. The method of claim 14, further comprising sending, via the server, the messages to the client device.

17. The method of claim 16, further comprising annotating, at the server, each message sent to the client device with a sequence number assigned by the server.

18. The method of claim 17, further comprising sending, from the client device to the server, a respective sequence acknowledgement message annotation for each message sent to the client device.

* * * * *